United States Patent Office 2,756,257
Patented July 24, 1956

2,756,257

PROCESS FOR PREPARING COMPOSITIONS FROM 6-CAPROLACTAM AND HEXAMETHYLENE DIAMINE

Gelu Stoeff Stamatoff, Newark, Del., assignor to E. I. du Pont de Nemours and Company, Wilmington, Del., a corporation of Delaware No Drawing. Application May 10, 1954,
Serial No. 428,849

2 Claims. (Cl. 260—561)

This invention relates to processes for the preparation of interpolymers from 6-caprolactam and certain other amide-forming components.

Interpolymers of 6-caprolactam with other polyamide-forming monomers have been well known in the art for many years. These interpolymers have found practical application in instances where an extrudable nylon of relatively low melting point is required (cf. U. S. P. 2,276,437, issued to G. T. Vaala on May 17, 1942; U. S. P. 2,320,088, issued March 25, 1943, to R. M. Leekly; U. S. P. 2,345,533, issued March 28, 1944, to G. D. Graves; U. S. P. 2,352,725, issued June 4, 1944, to W. H. Markwood, Jr.; U. S. P. 2,359,878, issued October 10, 1944, to O. E. Schupp, Jr.; U. S. P. 2,365,508, issued December 19, 1944, to P. R. Austin; U. S. P. 2,367,469, issued January 16, 1945, to P. Moller; U. S. P. 2,374,137, issued April 17, 1945, to L. F. Salisbury; U. S. P. 2,378,977, issued June 26, 1945, to M. M. Brubaker; U. S. P. 2,396,415, issued March 19, 1946, to F. C. McGrew; U. S. P. 2,405,965, issued August 20, 1946, to R. M. Leekley; U. S. P. 2,420,455, issued May 13, 1947, to W. W. Watkins).

The process for making these interpolymers as indicated in the above-mentioned patents has been to treat a diamine salt such as hexamethylenediammonium adipate with 6-caprolactam. The reactivity of 6-caprolactam towards dibasic acids (cf. U. S. P. 2,293,388), issued August 18, 1942 to W. E. Hanford), and also towards certain amines (cf. patents cited below) has been recognized heretofore but it has not been known that 6-caproalctam interpolymers, containing polyamide-forming ingredients other than 6-caprolactam, could be made from caprolactam-diamine adducts. U. S. P. 2,615,863, issued to P. J. Flory on August 28, 1952, discloses that 6-caprolactam reacts with polyamines which contain at least three reactive amino groups to produce opening of the lactam ring with the formation of low molecular weight polymers. The reaction of mono amines with caprolactam to produce polymeric material is disclosed in U. S. P. 2,526,078, issued August 17, 1950, to E. L. Kropa. In view of these disclosures pertaining to the reactivity of 6-caprolactam towards amines, it is somewhat surprising that hexamethylene diamine which is the most common of the diamine components of nylon type resins, was not known heretofore to react with 6-caprolactam. In fact, attempts to produce an adduct of 6-caprolactam and hexamethylenediamine at the temperatures which are employed in carrying out the reaction of mono amines with 6-caprolactam have not been successful.

An object of this invention is to prepare interpolymers of 6-caprolactam and other polyamide-forming components without the intermediate formation of an amine salt such as hexamethylenediammonium adipate. Another object of this invention is to prepare an adduct of 6-caprolactam and hexamethylenediamine. A still further object of this invention is to prepare novel interpolymers from the said 6-caprolactam-hexamethylene diamine adduct. Still another object of the invention is to provide 6-caprolactam-hexamethylene polyoxamide interpolymers and a process for producing the same.

It has been discovered in accordance with this invention that although hexamethylene diamine does not react readily with 6-caprolactam at ordinary temperatures an adduct of these reactants is produced by heating hexamethylene diamine with 6-caprolactam at elevated temperatures especially at temperatures within the range of about 200° to 300° C. The resulting adduct is a low molecular weight material which is capable of reacting with an oxalic acid compound (particularly a dialkyl ester of oxalic acid or a diaryl ester of oxalic acid) to produce a 6-caprolactam hexamethylene polyoxamide prepolymer which on further condensation is converted to a high molecular weight polyoxamide. If desired, a catalyst may be employed during the formation of the adduct and also during the subsequent condensation step or steps. The condensation reactions need not be carried out at temperatures as high as the temperature employed in the formation of the adduct. Temperatures in the range of 25° to 100° C. may be used in producing the prepolymer from the adduct and the oxalic acid compound. The conversion of the polymer into a high molecular weight polymer can be accomplished at maximum temperatures within the range of 200° to 300°. Inert solvents may be employed in one or more of the stages required for formation of the high molecular weight polymer. The catalysts which are effective in these respective stages are the same as have been employed heretofore for catalyzing the formation of linear polyamides from diamine salts of dibasic acids. These include phosphorus acids, e. g., phosphorus and phosphoric acids, in the proportions of 0.005 to 0.5 (or more) percent by weight, based on the weight of hexamethylene diamine-caprolactam adduct ingredients.

The invention is illustrated further by means of the following examples.

*Example 1.*—Into a 500 cc. glass open vessel was placed the following: 161.9 grams hexamethylene diamine, 157.5 grams caprolactam, and 0.7 gram sodium. The vessel was placed in a pressure-resistant container, and was surrounded by a nitrogen blanket. The container was closed and the mixture was heated, the temperature thus being gradually raised to 200° during a period of one hour. At this point the pressure was released and heating was continued, with temperature gradually rising to 260° C., over an additional period of 2 hours and 10 minutes. The vessel and container were permitted to cool to room temperature. The product thus obtained was a clear gelatinous mass which on stirring liquefied, and then solidified into a soft waxy mass.

*Example 2.*—Into a 500 cc. glass open vessel was placed the following: 194.4 grams hexamethylene diamine, 190.0 grams caprolactam, and 0.385 gram phosphorous acid. The vessel was placed in a pressure-resistant container, and was surrounded by a nitrogen blanket. The container was closed and the mixture was heated, the temperature gradually rising to 180° during a period of 45 minutes. Heating was then continued at 180° during a period of 45 minutes. Heating was then continued at 180°–280° C. at a maximum pressure of 50 lbs. per sq. in. for an additional period of 2.75 hours. The mixture, after cooling to room temperature, was a white waxy material, which upon titration in denatured alcohol, using 0.1006 N HCl and brom-phenol blue indicator, was found to have a basicity closely corresponding with $NH_2(CH_2)_5CONH(CH_2)_6NH_2$. To 16.745 grams of this caprolactam-hexamethylene diamine adduct was added 18.911 grams dibutyl oxalate and 15.0 cc. toluene and the ingredients were mixed in a beaker. Heating was continued in a stream of nitrogen at about 200°–250° for 2 hours (diphenyl bath). The resulting interpolymer had a softening point ("polymer stick temperature") of 225° C.

The entire experiment was repeated using 0.01% of phosphorous acid (based on total weight of adduct components) in forming the adduct. The results were substantially the same, the product being a lemon-yellow copolymer of composition 1 caprolactam: 1 hexamethylene: 1 oxamido constituent (mol proportions). The softening point of the copolymer was 218° C.

*Example 3.*—Hexamethylene diamine (8.0465 grams), and hexamethylene diamine-caprolactam adduct (15.772 grams) were placed together in a reaction tube and 30 ml. n-butanol was added thereto, and the mixture was heated until the solid dissolved. To the mixture was added 27.7814 grams dibutyl oxalate, with 5 grams of additional butanol, and the resulting composition was heated in a nitrogen atmosphere at 274° for about 2 hours, to give an interpolymer of the composition 1 caprolactam: 2 hexamethylene: 2 oxamido constituent (mol proportions). The softening point of the polymer was about 195° C.

*Example 4.*—Hexamethylene diamine-caprolactam adduct, prepared as described in Example 2 using 0.01% of phosphorous acid, was weighed into a beaker (weight of adduct, 20.4944 grams) and benzene (25 cc.), which had been dried over sodium, was added with stirring. To the resulting slurry was added dibutyl oxalate with rapid stirring whereby a prepolymer was formed. The prepolymer was transferred to a reaction tube wherein it was heated in a current of nitrogen for about 100 minutes at 273°–274° C. The resulting interpolymer (1 caprolactam: 1 hexamethylene: 1 oxamido) had an inherent viscosity of 0.98 and a softening point of 230° C.

While in the foregoing examples dibutyl oxalate is exemplified as the source of oxamido groups, it is to be understood that oxalic acid or any of its esters can be used in a similar way to provide that component of the interpolymer.

Various 6-caprolactam-hexamethylene polyoxamide interpolymers prepared by general methods described in the foregoing examples had the following properties.

*Properties of 6-caprolactam-hexamethylene polyoxamide interpolymers*

| Molar Ratio—6-Caprolactam: Hexamethylene Polyoxamide | Polymer Stick Temperature, °C. | Catalyst for Condensation | Inherent Viscosity (measured in 0.5% solution in Dimethyl formamide) |
|---|---|---|---|
| 50:50 | 230 | $H_3PO_3$ | 0.98 |
| 50:50 | 234 | None | 1.05 |
| 50:50 | | $H_3PO_4$ | 0.78 |
| 59:41 | 250 | $H_3PO_3$ | 0.86 |
| 55:45 | 245 | $H_3PO_3$ | 0.97 |

The interpolymers obtained by the process of this invention are useful in the form of a molding powder which is particularly well suited for use in the production of shaped articles especially in applications where water sensitivity is not a serious disadvantage. One of the important advantages of the interpolymers hereinabove described is their potential low cost. Oxalic acid is one of the cheapest of the dibasic acids and its use in polyamide manufacture as a substitute for part of the adipic acid, normally employed both in making the diamine and the acid component, would increase the total potential production capacity of polyamides without requiring an increase in the adipic acid production capacity.

The molar ratio of 6-caprolactam:hexamethylene polyoxamide can be varied quite widely. On the other hand, the ratio of hexamethylenediamine:oxalic acid compound in the interpolymers appears to be limited to 1:1 if products of high molecular weight are to be obtained.

The 6-caprolactam hexamethylenediamine adduct can be used in the manufacture of a wide variety of other polymers by reaction with difunctional compounds (dibasic acids, esters of dibasic acids, diacyl halides, disulphonyl halides, etc.), and it thus has a very wide range of practical utility aside from its use in the manufacture of the polyoxamide interpolymers hereinabove disclosed.

I claim:

1. A process for preparing $$NH_2(CH_2)_5CONH(CH_2)_6NH_2$$

which consists essentially in heating 6-caprolactam with hexamethylenediamine at a temperature of 200° to 300° C., whereby $NH_2(CH_2)_5CONH(CH_2)_6NH_2$ is produced.

2. Process of claim 1 performed in the presence of phosphorous acid as catalyst.

References Cited in the file of this patent

UNITED STATES PATENTS

| | | |
|---|---|---|
| 2,285,009 | Brubaker et al. | June 2, 1942 |
| 2,293,388 | Hanford | Aug. 18, 1942 |
| 2,356,702 | Schlack | Aug. 22, 1944 |
| 2,609,381 | Goldstein | Sept. 2, 1952 |
| 2,689,239 | Melamed | Sept. 14, 1954 |

FOREIGN PATENTS

| | | |
|---|---|---|
| 881,998 | France | Feb. 8, 1943 |